(12) United States Patent
Han et al.

(10) Patent No.: US 12,165,431 B2
(45) Date of Patent: *Dec. 10, 2024

(54) ENROLLMENT USING SYNTHETIC FINGERPRINT IMAGE AND FINGERPRINT SENSING SYSTEMS

(71) Applicant: Apple Inc., Cupertino, CA (US)

(72) Inventors: Byron B. Han, San Jose, CA (US); Craig A. Marciniak, San Jose, CA (US)

(73) Assignee: Apple Inc., Cupertino, CA (US)

(*) Notice: Subject to any disclaimer, the term of this patent is extended or adjusted under 35 U.S.C. 154(b) by 149 days.

This patent is subject to a terminal disclaimer.

(21) Appl. No.: 17/944,863

(22) Filed: Sep. 14, 2022

(65) Prior Publication Data

US 2023/0005288 A1    Jan. 5, 2023

Related U.S. Application Data

(63) Continuation of application No. 17/141,088, filed on Jan. 4, 2021, now Pat. No. 11,475,691, which is a (Continued)

(51) Int. Cl.
*G06V 40/12* (2022.01)
*G06F 3/02* (2006.01)
(Continued)

(52) U.S. Cl.
CPC ........ *G06V 40/1335* (2022.01); *G06V 10/147* (2022.01); *G06V 40/12* (2022.01);
(Continued)

(58) Field of Classification Search
CPC .... G06V 40/1335; G06V 40/67; G06V 40/12; G06V 40/1365; G06V 40/13; G06V 40/1306; G06V 10/147; G06V 40/53
See application file for complete search history.

(56) References Cited

U.S. PATENT DOCUMENTS 4,208,651 A   6/1980   McMahon
5,659,626 A   8/1997   Ort
(Continued)

FOREIGN PATENT DOCUMENTS

CN    1300408     6/2001
CN    101079087   3/2005
(Continued)

OTHER PUBLICATIONS

Anonymous, "WordPress › Limit Login Attempts < WordPress Plugins," Apr. 19, 2014, XP055202312, Retrieved from the Internet: URL:https://web.archive.org/web/20140419102326/http://wordpress.org/plugins/limit-login-attempts/screenshots/ [retrieved on Jul. 14, 2015], 3 pages.

(Continued)

*Primary Examiner* — Utpal D Shah
(74) *Attorney, Agent, or Firm* — Brownstein Hyatt Farber Schreck, LLP

(57) ABSTRACT

A fingerprint sensing system. The fingerprint sensing system includes: at least one sensor; at least one display device; at least one application processor; and at least one secure enclave processor. The application processor(s) receives fingerprint data from the sensor(s) and provides the fingerprint data to the secure enclave processor(s). The secure enclave processor(s) decodes the fingerprint data and provides a signal indicative of at least one matched node. The application processor(s), responsive to receipt of the signal indicative of the matched node(s), presents at least a portion of a synthetic fingerprint image via at least one display device corresponding to the matched node(s).

20 Claims, 8 Drawing Sheets

Related U.S. Application Data continuation of application No. 16/287,943, filed on Feb. 27, 2019, now Pat. No. 10,885,293, which is a continuation of application No. 15/607,354, filed on May 26, 2017, now Pat. No. 10,255,474, which is a continuation of application No. 14/566,495, filed on Dec. 10, 2014, now Pat. No. 9,665,785, which is a continuation of application No. 14/243,858, filed on Apr. 2, 2014, now Pat. No. 8,913,802, which is a continuation of application No. 13/802,695, filed on Mar. 13, 2013, now Pat. No. 8,913,801.

(60) Provisional application No. 61/666,595, filed on Jun. 29, 2012.

(51) Int. Cl.
  *G06F 21/32* (2013.01)
  *G06V 10/147* (2022.01)
  *G06V 40/13* (2022.01)
  *G06V 40/60* (2022.01)
  *G06V 40/50* (2022.01)

(52) U.S. Cl.
  CPC .......... *G06V 40/13* (2022.01); *G06V 40/1306* (2022.01); *G06V 40/1365* (2022.01); *G06V 40/67* (2022.01); *G06F 3/0227* (2013.01); *G06F 21/32* (2013.01); *G06V 40/53* (2022.01)

(56) References Cited

U.S. PATENT DOCUMENTS

| | | |
|---|---|---|
| 5,799,098 A | 8/1998 | Ort |
| 5,926,555 A | 7/1999 | Ort |
| 5,982,914 A | 11/1999 | Lee et al. |
| 5,999,098 A | 12/1999 | Lian |
| 6,289,114 B1 | 9/2001 | Mainguet |
| 6,323,846 B1 | 11/2001 | Westerman et al. |
| 6,546,122 B1 | 4/2003 | Russo |
| 6,570,557 B1 | 5/2003 | Westerman et al. |
| 6,677,932 B1 | 1/2004 | Westerman |
| 6,795,569 B1 | 9/2004 | Setlak |
| 6,888,536 B2 | 5/2005 | Westerman et al. |
| 6,898,301 B2 | 5/2005 | Iwanaga |
| 6,950,540 B2 | 9/2005 | Higuchi |
| 6,961,452 B2* | 11/2005 | Fujii ............... G06V 10/772 382/125 |
| 7,103,200 B2 | 9/2006 | Hillhouse |
| 7,151,846 B1* | 12/2006 | Fujii ............... G06V 40/1365 382/125 |
| 7,194,115 B2 | 3/2007 | Uchida |
| 7,194,116 B2 | 3/2007 | Du et al. |
| 7,194,393 B2 | 3/2007 | Wei |
| 7,280,677 B2 | 10/2007 | Chandler et al. |
| 7,321,672 B2 | 1/2008 | Sasaki et al. |
| 7,372,979 B2 | 5/2008 | Hillhouse |
| 7,493,496 B2 | 2/2009 | Smith et al. |
| 7,512,571 B2 | 3/2009 | Rudolf |
| 7,549,161 B2 | 6/2009 | Poo et al. |
| 7,599,530 B2 | 10/2009 | Boshra |
| 7,616,787 B2 | 11/2009 | Boshra |
| 7,693,314 B2 | 4/2010 | Tykowski et al. |
| 8,036,431 B1 | 4/2011 | Fisher et al. |
| 8,131,026 B2 | 3/2012 | Benkley et al. |
| 8,255,699 B2 | 8/2012 | Tagscherer |
| 8,276,816 B2 | 10/2012 | Gardner |
| 8,295,561 B2 | 10/2012 | Kwan |
| 8,296,573 B2 | 10/2012 | Bolle |
| 8,331,775 B2 | 12/2012 | Harper |
| 8,358,815 B2 | 1/2013 | Benkley et al. |
| 8,482,381 B2 | 7/2013 | Chatterjee et al. |
| 8,605,960 B2 | 12/2013 | Orsley |
| 8,611,618 B2 | 12/2013 | Kwon et al. |
| 8,736,421 B2 | 5/2014 | Abe |
| 8,796,881 B2 | 8/2014 | Davis |
| 8,824,749 B2 | 9/2014 | Leyvand et al. |
| 8,913,801 B2 | 12/2014 | Han et al. |
| 8,913,802 B2 | 12/2014 | Han et al. |
| 9,043,941 B2 | 5/2015 | Yamada et al. |
| 9,152,842 B2 | 10/2015 | Vieta et al. |
| 9,268,991 B2 | 2/2016 | Russo et al. |
| 9,348,987 B2 | 5/2016 | Boshra |
| 9,436,862 B2 | 9/2016 | Chang |
| 9,483,758 B2 | 11/2016 | Rhee et al. |
| 9,514,351 B2 | 12/2016 | Boshra |
| 9,576,126 B2 | 2/2017 | Boshra et al. |
| 9,665,785 B2 | 5/2017 | Han et al. |
| 9,792,420 B2 | 10/2017 | Uno et al. |
| 9,858,466 B2 | 1/2018 | Riopka et al. |
| 10,255,474 B2 | 4/2019 | Han et al. |
| 10,372,962 B2 | 8/2019 | Wright et al. |
| 10,885,293 B2 | 1/2021 | Han et al. |
| 2001/0031075 A1* | 10/2001 | Fujii .................. G06V 40/12 382/125 |
| 2004/0146186 A1* | 7/2004 | Gelbord ............... G06V 40/10 382/115 |
| 2007/0036400 A1 | 2/2007 | Watanabe et al. |
| 2007/0263912 A1 | 11/2007 | Biarnes et al. |
| 2008/0155269 A1* | 6/2008 | Yoshikawa ........... H04L 9/3231 713/186 |
| 2009/0322706 A1 | 12/2009 | Austin |
| 2010/0182123 A1 | 7/2010 | Press |
| 2011/0044513 A1 | 2/2011 | McGonagle et al. |
| 2013/0064434 A1* | 3/2013 | Riopka ............... G06V 10/772 382/125 |
| 2013/0223696 A1 | 8/2013 | Azar et al. |
| 2013/0278383 A1* | 10/2013 | Boshra ................. G06F 21/32 340/5.83 |
| 2013/0279768 A1* | 10/2013 | Boshra ................. G06F 21/32 382/124 |
| 2014/0003681 A1 | 1/2014 | Wright et al. |
| 2015/0131876 A1* | 5/2015 | Chang ................ G06F 3/0488 382/124 |
| 2015/0349959 A1 | 12/2015 | Marciniak |
| 2018/0204080 A1 | 7/2018 | Thieme et al. |
| 2018/0211093 A1 | 7/2018 | Bae et al. |
| 2021/0124898 A1 | 4/2021 | Wright et al. |

FOREIGN PATENT DOCUMENTS

| | | |
|---|---|---|
| CN | 1674038 | 9/2005 |
| CN | 101030246 | 9/2007 |
| CN | 101065761 | 10/2007 |
| CN | 101383002 | 3/2009 |
| CN | 101877068 | 11/2010 |
| CN | 102292740 | 12/2011 |
| CN | 103488416 | 1/2014 |
| CN | 102289877 | 12/2021 |
| EP | 1302907 | 4/2003 |
| EP | 1519326 | 3/2005 |
| EP | 1533759 | 5/2005 |
| JP | H1131218 | 2/1999 |
| TW | 201120763 | 6/2011 |

OTHER PUBLICATIONS

Cappelli, "SFinGe: an Approach to Synthetic Fingerprint Generation," DEIS, University of Bologna, Italy, 2004.

Nasser et al., "User Interface Design of the Interactive Fingerprint Recognition (INFIR) System," Proceedings of the 2006 International Conference on Security & Management, SAM 2006, Jun. 26, 2009, pp. 371-377, XP055084842, retrieved from the Internet on Oct. 22, 2013: URL:http://wwl.ucmss.com/books/LFS/CSREA2006/SAM8023.pdf.

Riley et al., "Instruction, Feedback and Biometrics: The User Interface for Fingerprint Authentication Systems," Human-Computer Interaction A Interact, 2009, Springer Berlin Heidelberg, pp. 293-305, XP019126310, ISBN: 978-3-642-03657-6.

Ryu et al., "Template Adaptation based Fingerprint Verification," Pattern Recognition, 2006, ICPR 2006, 18th International Conference on vol. 4, IEEE, 2006, 4 pages.

(56) References Cited

OTHER PUBLICATIONS

Söderlund, "How do I best tell a user that his/her account will be locked if they enter the wrong credentials too many times?", Jul. 30, 2013, XP055202317, Retrieved from the Internet: URL:https://web.archive.org/web/20130730052456/http://us.stackexchange.com/questions/25621/how-do-i-best-tell-a-user-that-his-her-account-will-be-locked-if-they-enter-the [retrieved on Jul. 14, 2015], 3 pages.
Uz et al., "Minutiae-Based Template Synthesis and Matching Using Hierarchical Delaunay Triangulations," *Biometrics: Theory, Applications, and Systems*, 2007, First IEEE International Conference, Sep. 1, 2007, pp. 1-8, XP031189988, ISBN: 978-1-4244-1596-0, Section II, IV, V.
Jun, "Design of automatic fingerprint collection system," China Outstanding Master's Degree Thesis Full Text Database (Master) Information Technology Series No. 05, Issue date: May 15, 2006, 132 pages.

\* cited by examiner

ENROLLMENT USING SYNTHETIC FINGERPRINT IMAGE AND FINGERPRINT SENSING SYSTEMS

CROSS-REFERENCE TO RELATED APPLICATIONS

The present application is a continuation of U.S. patent application Ser. No. 17/141,088, filed Jan. 4, 2021, which is a continuation of U.S. patent application Ser. No. 16/287,943, filed Feb. 27, 2019, now U.S. Pat. No. 10,885,293, which is a continuation of U.S. patent application Ser. No. 15/607,354, filed May 26, 2017, now U.S. Pat. No. 10,255,474, which is a continuation of U.S. patent application Ser. No. 14/566,495, filed Dec. 10, 2014, now U.S. Pat. No. 9,665,785, which is a continuation of U.S. patent application Ser. No. 14/243,858, filed Apr. 2, 2014, now U.S. Pat. No. 8,913,802, which is a continuation of U.S. patent application Ser. No. 13/802,695, filed Mar. 13, 2013, now U.S. Pat. No. 8,913,801, which claims the benefit under 35 U.S.C. § 119(e) to U.S. Provisional Patent Application No. 61/666,595, which was filed on Jun. 29, 2012, all of which are incorporated by reference as if fully disclosed herein.

TECHNICAL FIELD

Embodiments described herein relate generally to fingerprint sensing systems and examples of enrollment using synthetic fingerprint images are described.

BACKGROUND DESCRIPTION

Fingerprint sensing technology has become widespread in use and is often used to provide secure access to sensitive electronic devices and/or data. Generally, capacitive fingerprint sensors may be used to determine an image of a fingerprint through measuring capacitance through multiple capacitive sensing elements. The higher the capacitance, the nearer the surface of an adjacent or overlying finger to the capacitive sensing element. Thus, fingerprint ridges provide a higher capacitance to an underlying capacitive sensing element than do fingerprint valleys.

Data generated by a fingerprint sensor may be encrypted for security purposes and processed using a secure processor. A fingerprint match to a known fingerprint image may also be determined by the secure processor. In this manner, fingerprint data may be kept secure and may not be exposed unencrypted or unsecured to non-secure processors.

Fingerprint images may generally be considered to be made up of several 'nodes', with each node representing a region of the fingerprint image. Nodes may generally be overlapping, such that the nodes may be stitched together to form an entire fingerprint image.

Fingerprint sensors may be smaller than the fingerprint, and a user may be required to roll, swipe, or otherwise move their finger to expose different regions of the finger to the fingerprint sensor in order for the system to obtain a complete fingerprint image.

SUMMARY

One sample embodiment, as described herein, is a fingerprint sensing system. The fingerprint sensing system includes: at least one sensor; at least one display device; at least one application processor; and at least one secure enclave processor. The application processor(s) receives fingerprint data from the sensor(s) and provides the fingerprint data to the secure enclave processor(s). The secure enclave processor(s) decodes the fingerprint data and provides a signal indicative of at least one matched node. The application processor(s), responsive to receipt of the signal indicative of the matched node(s), presents at least a portion of a synthetic fingerprint image via at least one display device corresponding to the matched node(s).

Another example embodiment, as described herein, is a method of fingerprint sensing, the method includes receiving fingerprint data from at least one sensor utilizing at least one application processor. The fingerprint data is provided to at least one secure enclave processor utilizing the application processor(s). The secure enclave processor(s) decodes the fingerprint data and provides a signal indicative of at least one matched node. Responsive to receipt of the signal indicative of the matched node(s), at least a portion of a synthetic fingerprint image is presented via at least one display device, the portion of the synthetic fingerprint image corresponding to the matched node(s) utilizing the application processor(s).

A further example embodiment, as described herein, is a fingerprint sensing system. The fingerprint sensing system includes: a sensor; a display device; an application processor; and a secure enclave processor. The application processor is configured to provide at least a portion of a synthetic fingerprint image for display on the display device. The application processor is also configured to receive fingerprint data from the sensor and provide the fingerprint data to the secure enclave processor. The secure enclave processor is configured to decode the fingerprint data and provide a signal indicative of a matched node. The application processor, responsive to receipt of the signal indicative of the matched node, is configured to change a portion of the synthetic fingerprint image corresponding to the matched node.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

DETAILED DESCRIPTION

Figure 1:
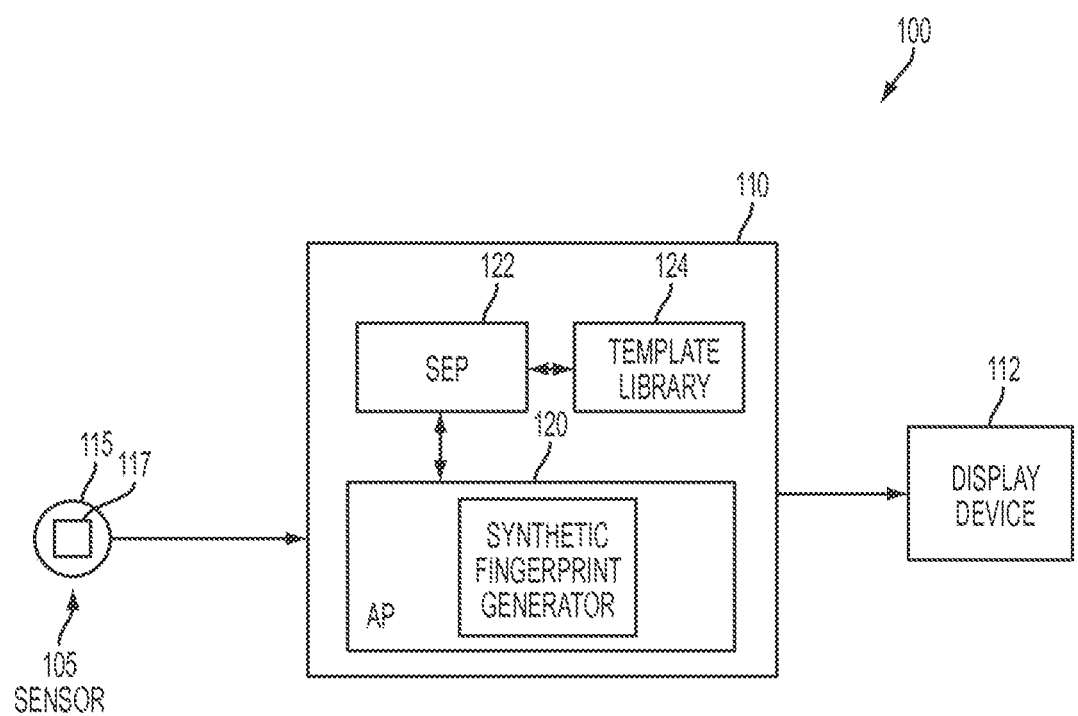
FIG. 1 is a schematic illustration of a fingerprint sensing system in accordance with an embodiment of the present invention.

The use of fingerprint sensing technology to provide secure access to sensitive electronic devices and/or data is gaining in popularity. Embodiments described herein may be configured to operate with a variety of sensors, including strip or swipe sensors, array or other two-dimensional sensors, and the like. Capacitive fingerprint sensors are one technology that may be used to determine the image of a fingerprint.

Because fingerprint sensors may be smaller than the fingerprint, a user may be required to roll, swipe, or otherwise move their finger to expose different regions of the finger to the fingerprint sensor for the system to obtain a complete fingerprint image. However, it may be difficult for the user to be certain a sufficient amount of their finger has been exposed to the fingerprint sensor. Further, the user may not be aware that certain portions of their finger were not exposed to the sensor (e.g. missed the sensor or were never intended to be placed on the sensor). Accordingly, it may be useful for the fingerprint sensor system to provide a feedback mechanism to inform a user which portions of their finger have passed over the sensor (or, in some examples, which portions of their finger have been matched to stored data).

Thus, example embodiments described herein, may display an image of a fingerprint on a display device during an enrollment process or testing process to provide feedback to a user regarding portions of the finger which need to be presented to the sensor. However, it may be undesirable to display an image of an actual user's fingerprint on the display for security reasons. Accordingly, it may be useful to display a synthetic fingerprint rather than the user's actual fingerprint for these operations.

The following terminology is exemplary, and not intended to be limiting in any way.

The text "capacitive sensing element", and variants thereof, generally refers to one or more sensors that may sense data elements of any kind, including information sensed with respect to individual locations. For example and without limitation, a capacitive sensing element may sense data or other information with respect to a relatively small region of a fingerprint image.

After reading this application, those skilled in the art would recognize that these statements of terminology would be applicable to techniques, methods, physical elements, and systems (whether currently known or otherwise), including extensions thereof inferred or inferable by those skilled in the art after reading this application.

Generally, examples described herein include fingerprint sensing systems that may facilitate enrollment using a synthetic fingerprint image. Enrollment includes a process by which a user may roll, swipe, or otherwise move their finger across a fingerprint sensor so the fingerprint sensing system may obtain fingerprint data corresponding to the user's finger. The fingerprint sensing system during enrollment may match the fingerprint data corresponding to the user's finger to known, stored, fingerprint data to identify (e.g. authenticate) the user.

It may be difficult for the user to be certain a sufficient amount of their finger has been exposed to the fingerprint sensor. For example, the user may not be aware that certain portions of their finger were not exposed to the sensor (e.g. missed the sensor or were never intended to be placed on the sensor). Accordingly, examples of the present invention may provide a feedback mechanism to inform a user which portions of their finger have passed over the sensor (or, in some examples, which portions of their finger have been matched to stored data).

In some examples, an image of a fingerprint is displayed on a display screen viewable by the user to inform the user which portions of their finger no longer need to be passed over the sensor to complete enrollment. As will be described further below, portions of the displayed fingerprint may be filled in, or otherwise changed, reflecting the portions which are no longer needed. However, it may not be desirable to display an image of the actual fingerprint data being collected by the fingerprint sensor, because doing so may compromise the security of the fingerprint data (e.g. if malicious screen capture software is running on the device that may capture the displayed fingerprint data). Accordingly, examples described below may provide for a synthetic fingerprint image to be displayed and to provide feedback to the user by altering portions of the synthetic fingerprint image during an enrollment process. The synthetic fingerprint image may be a static predetermined image or in some examples the synthetic fingerprint image may be generated using the actual received fingerprint information from the fingerprint sensor, or may be generated using other factors—e.g. time of day.

FIG. 1 is a schematic illustration of a fingerprint sensing system 100 according to an embodiment of the present invention. The fingerprint sensing system 100 includes a sensor 105, a processing platform 110 and a display device 112. Other components, including user interface elements, may be included in the fingerprint sensing system 100 in other embodiments.

The sensor 105 may include any type of fingerprint sensor, such as a capacitive sensor or capacitive sensing element that may generate signals corresponding to ridges and valleys of a fingerprint. The sensor 105 may include an active area 115 that is responsive to ridges and valleys placed on the active area 115. The sensor 105 may be below or adjacent a user interface element, such as a button 117. The active area 115 of the sensor 105 may be smaller than an entire fingerprint in some embodiments. Accordingly, as has been described above, a user may be required to move a finger around in order to expose the entire fingerprint to the active area 115.

The processing platform 110 may include any number of processing unit(s), each of which may be implemented by a processor, and computer readable storage media sufficient to store executable instructions that, when executed by the processing unit(s), may cause the processing unit(s) to perform the functions described herein. The actual hardware and software configuration of the processing platform 110 may vary in different embodiments. The processing platform 110 includes an application processor (AP) 120 and a secure enclave processor (SEP) 122. The application processor 120 may be implemented using one or more suitable processors, and the secure enclave processor 122 may also be implemented using one or more processors, which processors are different than those used to implement the application processor 120. In some examples, the application processor 120 may be implemented using a device's central processing unit (CPU), while the secure enclave processor 122 may be a separate processor.

The secure enclave processor 122 is generally used to manipulate secure data (e.g. to decrypt encrypted fingerprint data from the sensor 105 and match the decrypted data with stored fingerprint template data in a template library 124). The template library 124 may be stored on any computer readable storage medium (e.g. memory) in communication with the secure enclave processor 122, and one or more distinct computer readable storage media may be used to implement the template library 124. The secure enclave processor 122 may have access to a key or other security parameter usable to decrypt data received from the sensor 105. For example, the secure enclave processor 122 and the sensor 105 may share a factory provisioned key, enabling the secure enclave processor 122 to decrypt data received from the sensor 105. The application processor 120 may not have access to the key or other security parameter, and may be unable to decrypt data received from the sensor 105. In this manner, the application processor 120 may be prevented from ever accessing decrypted data from the fingerprint sensor 105, which may improve the security of the fingerprint data, for example, making the decrypted fingerprint data inaccessible or less accessible to other programs which may be running on the application processor 120.

Embodiments of the present invention may display an image of a fingerprint on a display device, such as the display device 112 during an enrollment process to provide feedback to a user regarding portions of the finger which need to be presented to the sensor 105. However, it may be undesirable to display an image of an actual user's fingerprint on the display for security reasons. Accordingly, the application processor 120 may include a synthetic fingerprint generator 130. The synthetic fingerprint generator 130 may be implemented, for example by a computer readable storage medium or a plurality of such computer readable storage media (e.g. one or more memories) storing executable instructions for generating a synthetic fingerprint. The application processor 120 may execute the instructions for generating a synthetic fingerprint and cause the synthetic fingerprint to be displayed on the display device 112.

The synthetic fingerprint generator 130 may generate the synthetic fingerprint image in a variety of ways. The synthetic fingerprint is generally an image resembling a fingerprint but which is not a replica of the user's actual fingerprint. In some examples, a synthetic fingerprint image may be selected from a library of stored synthetic fingerprint images, which may be stored on a computer readable storage medium (e.g. memory) accessible to the application processor 120. In some examples, the synthetic fingerprint generator 130 may generate or select a synthetic fingerprint image whose features are determined based on some aspect of the enrollment process, including, but not limited to, time of day, type of device, device ID, node of fingerprint first captured, or combinations thereof.

During operation, a user may place all or a portion of their finger over the sensor 105. The sensor 105 may provide encrypted fingerprint data to the processing platform 110. The encrypted fingerprint data may be received by the application processor 120, however, the application processor 120 may not be able to decrypt the fingerprint data. The application processor 120 may provide the encrypted fingerprint data to the secure enclave processor 122. Moreover, the application processor 120 may, responsive to the initiation of an enrollment process, provide a synthetic fingerprint image on the display device 112. As described above, the synthetic fingerprint image may be provided from a stored image or may be generated responsive to an aspect of the enrollment process.

The secure enclave processor 122 may accordingly receive the encrypted fingerprint data, decrypt the fingerprint data, and search for a match in the template library 124. Generally, fingerprint data of nodes of a finger may be matched to stored fingerprint data in the template library 124. For example, the sensor 105 may not provide data at once representing an entire fingerprint image, but may provide fingerprint data representing a node (e.g. a portion of a fingerprint). The secure enclave processor 122 may match the node with data stored in the template library 124 to find a match. The secure enclave processor 122 may provide a signal indicative of a match, or lack thereof, to the application processor 120. The secure enclave processor 122 may further provide an indication to the application processor 120 of which node of the fingerprint was matched.

The application processor may display all or a portion of the synthetic fingerprint image on the display device 112. As nodes of the fingerprint are received and matched by the secure enclave processor, the application processor may cause corresponding portions of the synthetic fingerprint image displayed on the display device 112 to change, thereby providing feedback to the user of which portions of the fingerprint had been successfully received, and in some examples matched, by the secure enclave processor 122. The application processor 120 may provide this feedback by executing stored executable instructions for enrollment feedback, which may be stored in a computer readable storage medium (e.g. memory) accessible to the application processor 120.

Figure 2:
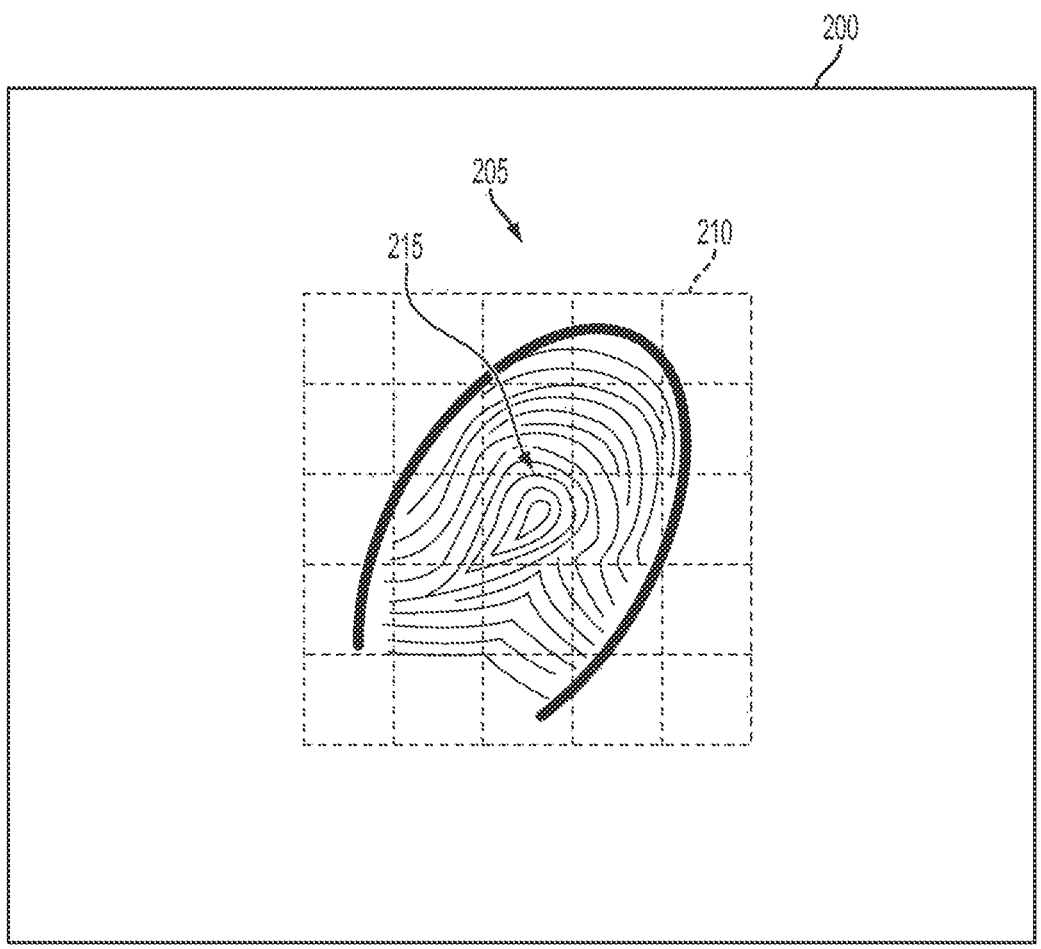
FIG. 2 is a schematic illustration of a synthetic fingerprint image displayed on a display device in accordance with an embodiment of the present invention.

FIG. 2 is a schematic illustration of a synthetic fingerprint image displayed on a display device in accordance with an embodiment of the present invention. The display device 200 may be implemented using the display device 112 of FIG. 1. The synthetic fingerprint image 205 may be a schematic representation of a fingerprint which may be displayed during enrollment, but which may not be an accurate representation of the fingerprint being enrolled, as has been described above. The different nodes of a fingerprint are shown schematically with dotted lines in FIG. 2. The grid 210 depicts regions of 16 nodes that may represent a fingerprint, for example, the node 215 is near a center of the fingerprint. The nodes are shown adjacent one another in FIG. 2 for ease of illustration, but in some embodiments of the present invention the nodes may overlap, allowing the nodes to be stitched together to form a completed fingerprint image. The grid 210 or other delineation of nodes may or may not itself be displayed on the display device 200.

Figure 3:
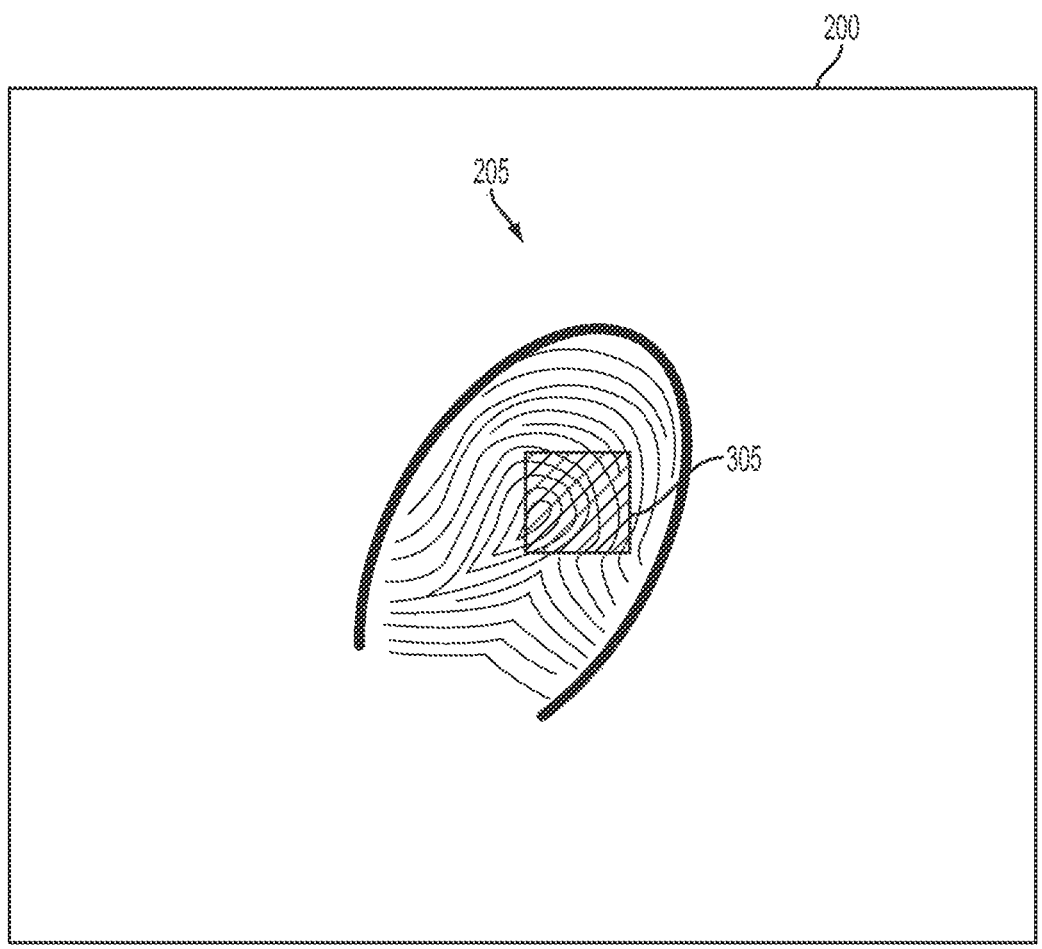
FIG. 3 is a schematic illustration of a synthetic fingerprint image displayed on a display device during an initial portion of an enrollment process in accordance with an embodiment of the present invention.

FIG. 3 is a schematic illustration of a synthetic fingerprint image displayed on a display device during an initial portion of an enrollment process in accordance with an embodiment of the present invention. In embodiments of the present invention, an indicator may be displayed on the display device 200 illustrating which node of a finger the user should attempt to present first, or next, to a sensor. The display device 200 of FIG. 3 may be implemented, for example, by the display device 112 of FIG. 1. The application processor as described in FIG. 1 may display the indication in accordance with computer executable instructions for the same stored in a medium accessible to the application processor. The indicator 305 may be a box, as illustrated in FIG. 3, and may be shaded, colored, outlined, or otherwise different than the surrounding image. In some examples, the indicator 305 may not have a contour, but portions of the synthetic fingerprint image 205 corresponding to the node to be indicated may instead be displayed in a different color, dashing, thickness, or otherwise different than the remaining synthetic fingerprint image 205.

Figure 4A:
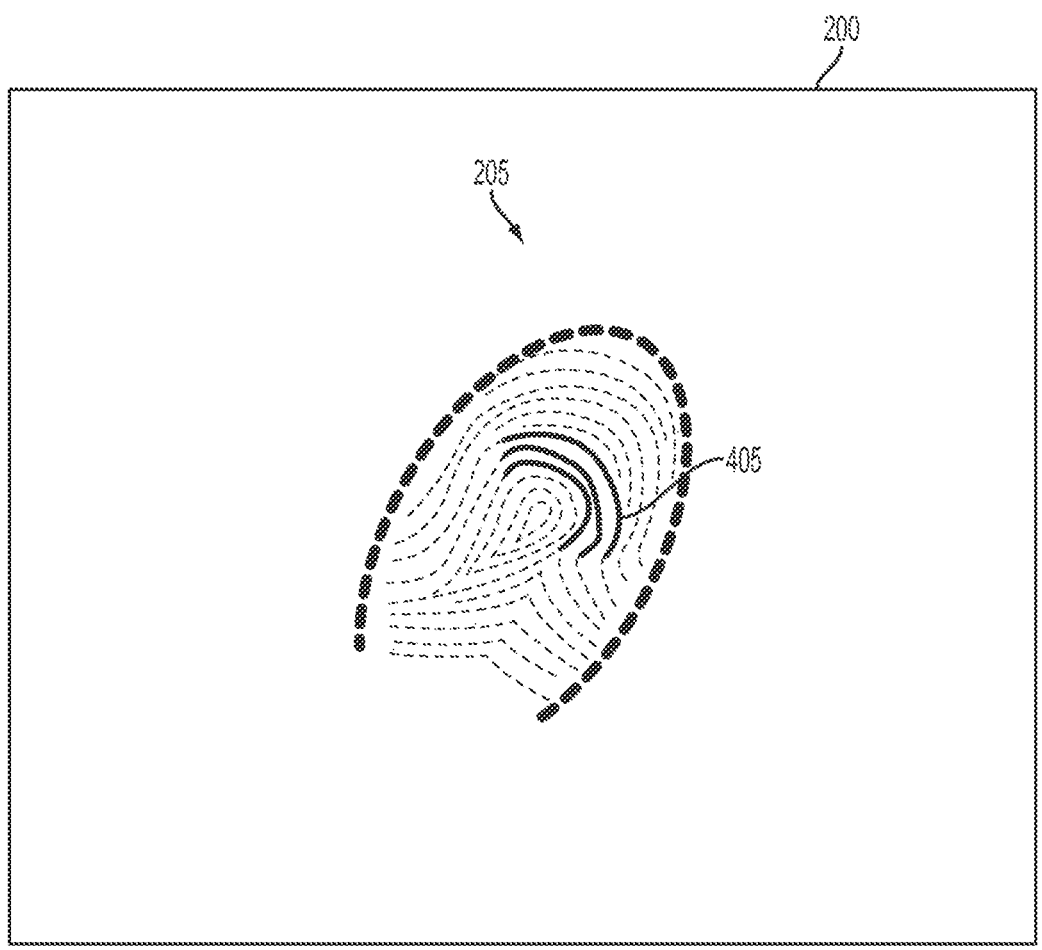
FIG. 4A is a schematic illustration of a synthetic fingerprint image displayed on a display device during an enrollment process in accordance with an embodiment of the present invention.

FIG. 4A is a schematic illustration of a synthetic fingerprint image displayed on a display device during an enrollment process in accordance with an embodiment of the present invention. In embodiments of the present invention, portions of a synthetic fingerprint image displayed on the display device 200 may change during the enrollment process to indicate to a user that those portions have been captured (e.g. matched) by the device. The display device 200 of FIG. 4A may be implemented, for example, by the display device 112 of FIG. 1. The application processor as described in FIG. 1 may change portions of the synthetic fingerprint image in accordance with computer executable instructions for the same stored in a medium accessible to the application processor. Portions of the synthetic fingerprint image may change, for example, by changing a dash pattern, color, shading, thickness, etc. of the lines making up the synthetic fingerprint image and/or regions of the synthetic fingerprint image, including the background. In the example of FIG. 4A, the synthetic fingerprint image 205 is shown in dashed lines. As a user enrolls a finger, portions (e.g. nodes) of the finger which are successfully captured may be displayed in solid lines, e.g. the node 405 shown in FIG. 4A has been successfully captured and is shown in solid lines. By changing portions of the synthetic fingerprint image during enrollment, a user may receive feedback as to which portions of the finger still need to be presented to a sensor, such as the sensor 105 of FIG. 1.

During operation, referring back to FIG. 1, the application processor 120 may cause the display device 112 to display a synthetic fingerprint image. The application processor 120 may further cause the display device 112 to display an indication of an initial node for fingerprint enrollment, in accordance with stored executable instructions. During enrollment, fingerprint data may be received by the application processor 120 from the sensor 105 and passed to the secure enclave processor 122. The secure enclave processor 122 may decode the fingerprint data and match the fingerprint data with data stored in the template library 124. The secure enclave processor 122 may provide a signal to the application processor 120 indicative of a matched node of the fingerprint. The application processor may accordingly cause the synthetic fingerprint image displayed on the display device 112 to change to indicate matching of the particular node has occurred.

Figure 4B:
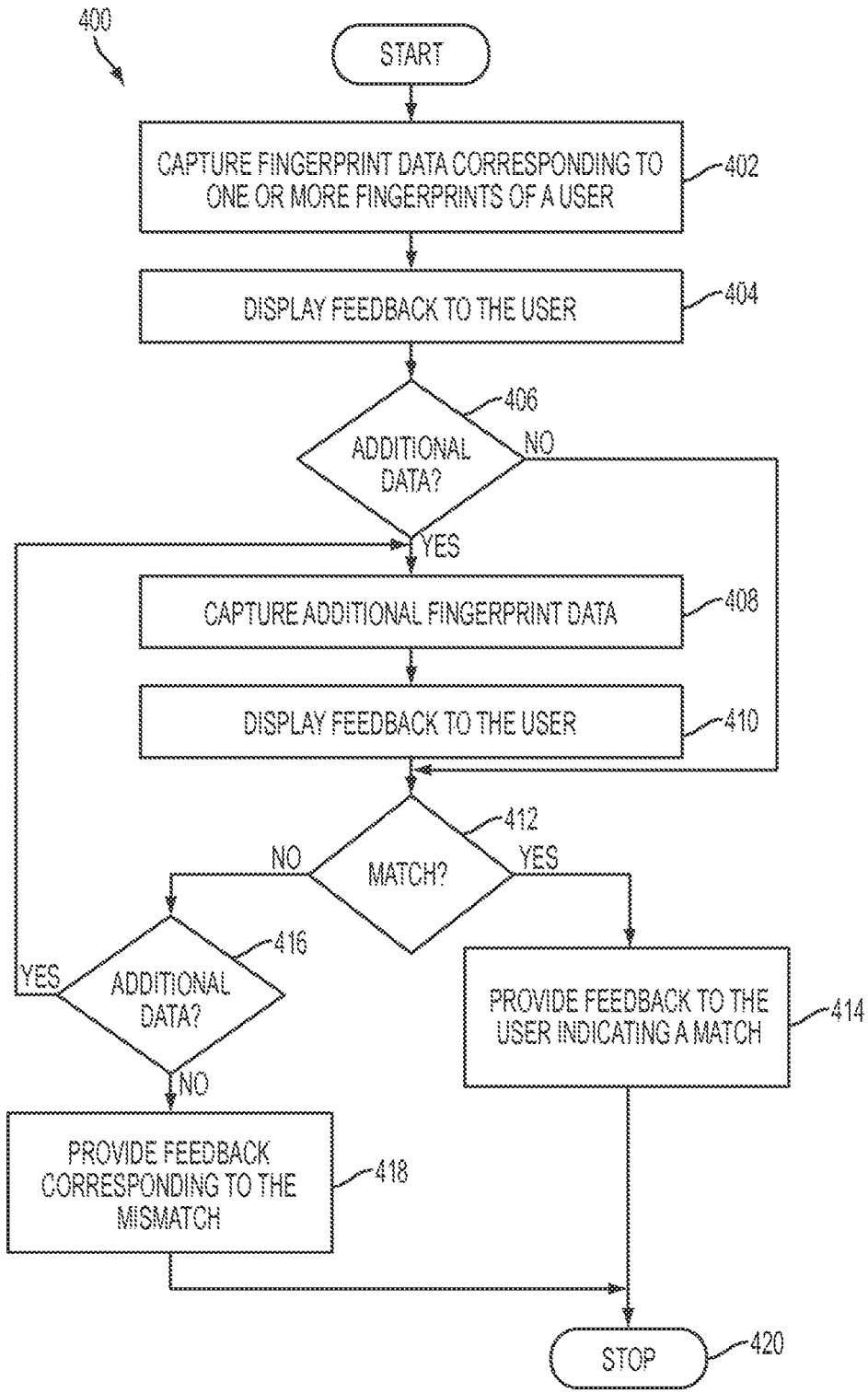
FIG. 4B is a flow chart illustrating a method for using the fingerprint sensing system to display feedback to a user.

An illustrative method for using the fingerprint sensing system will now be discussed in further detail. FIG. 4B is a flow chart illustrating a method for sensing fingerprint data and providing feedback to a user. The method 400 may begin with operation 402 and the sensor 105 may capture data corresponding to one or more fingerprints of a user. In other words, the sensor 105 may capture data corresponding to one or more features (examples of which include valleys and ridges) on a user's finger.

Once the initial fingerprint data has been captured, the method 400 may proceed to operation 404. In operation 404, the display device 112 may display feedback to the user. The feedback may include the synthetic fingerprint image, text, or the like. The feedback may correspond to the data received in operation 402. For example, the feedback may indicate to a user the portions of finger that were captured by the sensor 105, may provide a percentage of the finger surface sensed by the sensor 105, or the like.

After operation 404, the method 400 may proceed to operation 406. In operation 406, the processor 122 may determine whether additional data is required. For example, the processor may determine whether a sufficient number of nodes were captured by the sensor 105 in order to evaluate the fingerprint data to determine if there is a match. The number of nodes may depend on the size of the finger, the accuracy or sensitivity of the initial captured data, desired match accuracy, and so on.

In operation 406, if additional data is required, the method 400 may proceed to operation 408. In operation 408, the sensor 105 may be configured to capture additional fingerprint data. As one example, the display device 112 may provide output to a user requesting that he or she provide additional input to the sensor 105. In another example, the sensor 105 may automatically scan the sensing surface or area to sense the fingerprint (assuming the user's finger may not have been removed).

Once the additional data has been sensed, the method 400 may proceed to operation 410. In operation 410, the display device 112 may display feedback corresponding to the additional data. Operation 410 may be substantially similar to operation 404, but may vary the synthetic fingerprint or other output data based on the additional data collected. For example, one or more nodes of the synthetic fingerprint may be colored, thickened, highlighted, or the like to indicate to the user that those additional nodes were captured by the sensor 105. After operation 410, the method 400 may proceed to operation 412.

If in operation 406 no additional data is required, the method 400 may proceed to operation 412. In operation 412, the processor 122 may determine whether the sensed fingerprint data matches a stored data corresponding to a fingerprint. For example, the sensed data may be compared with a plurality of fingerprint templates. If in operation 412, the processor determines that the sensed fingerprint is a match, the method 400 may proceed to operation 414. In operation 414, the display device 112 may provide feedback to the user indicating the match of the fingerprint. For example, the synthetic fingerprint may be colored or filled in, highlighted, or the like.

If in operation 412, the sensed fingerprint data does not correspond to a stored fingerprint, the method 400 may proceed to operation 416. In operation 416 the processor may determine whether additional data is required. For example, the processor may have determined that the fingerprint was not a match due to insufficient or inaccurate data. In this case, the method 400 may return to operation 408 and the sensor may capture additional fingerprint data. However, if in operation 416, the processor determines additional data is not required, the method 400 may proceed to operation 418. For example, the processor may have sufficient data to analyze the fingerprint data and may determine that the data does not match any stored fingerprints. In these instances, during operation 418, the display device 112 may provide feedback corresponding to the mismatch or un-matched state of the fingerprint data. After either operation 414 or 418, the method 400 may proceed to an end state 420.

Figure 5:
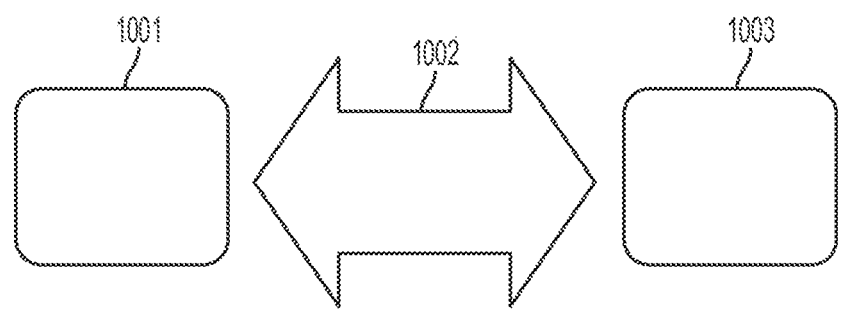
FIG. 5 is a schematic illustration of a system in accordance with an embodiment of the present invention.

FIG. 5 is a schematic illustration of a system in accordance with an embodiment of the present invention. Described embodiments may include touch I/O device 1001 that can receive touch input for interacting with computing system 1003 via wired or wireless communication channel 1002. The touch I/O device 1001 may include, for example the sensor 105 of FIG. 1 and the display device 112 of FIG. 1 in some embodiments. In some embodiments, the touch I/O device 1001 may include the sensor 105 of FIG. 1, but the display device 112 may be separate. The computing system 1003 may include, for example the platform 110 of FIG. 1 in some embodiments. Referring again to FIG. 5, touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to deice 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 6:
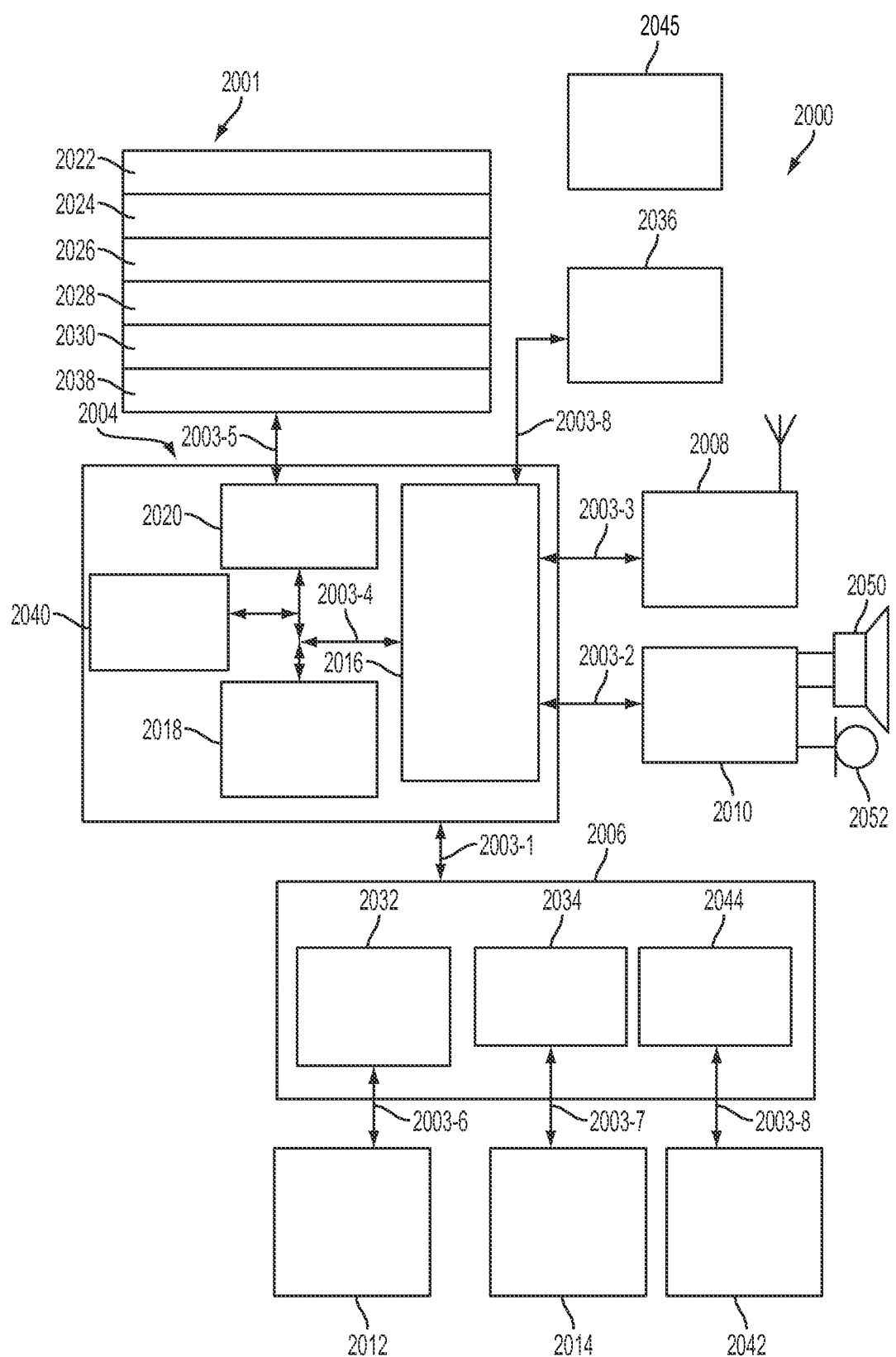
FIG. 6 is a block diagram of one embodiment of a system arranged in accordance with an embodiment of the present invention.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 6 is a block diagram of one embodiment of a system arranged in accordance with an embodiment of the present invention. The system 2000 generally includes one or more computer-readable media 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations. They system of FIG. 6 may represent a more detailed example of the system 100 of FIG. 1 in some embodiments. For example, the sensor 105 of FIG. 1 may be included in the Touch I/O device 2012 or fingerprint sensor 2042 of FIG. 6, the platform 110 of FIG. 1 may be implemented using the processing system 2004 of FIG. 6, and the display device may be included in the Touch I/O device 2012 and/or other I/O devices 2014 of FIG. 6.

It should be apparent that the architecture shown in FIG. 6 is only one example architecture of system 2000, and that system 2000 could have more or fewer components than shown, or a different configuration of components. The various components shown in FIG. 6 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable media 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, which may include instructions for synthetic fingerprint generation, instructions for feedback regarding initial fingerprint node indication, and instructions for feedback regarding enrolled nodes, as has been described above with reference to FIGS. 1-4, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise re-arranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc. The applications 2030 may also include applications for performing functions described above with reference to FIGS. 1-4, including synthetic fingerprint selection and/or display, feedback for initial enrollment node, and feedback for indicating captured nodes.

Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with FIGS. 1-4. Fingerprint sensing module 2038 may at least function to perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad); the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety for any purpose.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2045 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. The operation of these various elements will now be described.

The fingerprint sensor 2042 may operate to capacitively capture a series of images, or nodes. When taken together, these nodes may form a fingerprint. The full set of nodes may be referred to herein as a "mesh."

Each node in the mesh may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the mesh.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. Generally, the fingerprint data is encrypted by any of the fingerprint sensor 2042, the fingerprint I/O controller 2044 or another element prior to being transmitted to either processor. The secure processor 2040 may decrypt the data to reconstruct the node.

Fingerprint data, either as nodes or meshes, may be stored in the computer-readable medium 2001 and accessed as necessary. In some embodiments, only the secure processor 2040 may access stored fingerprint data, while in other embodiments either the secure processor or the processor 2018 may access such data.

Figure 7:
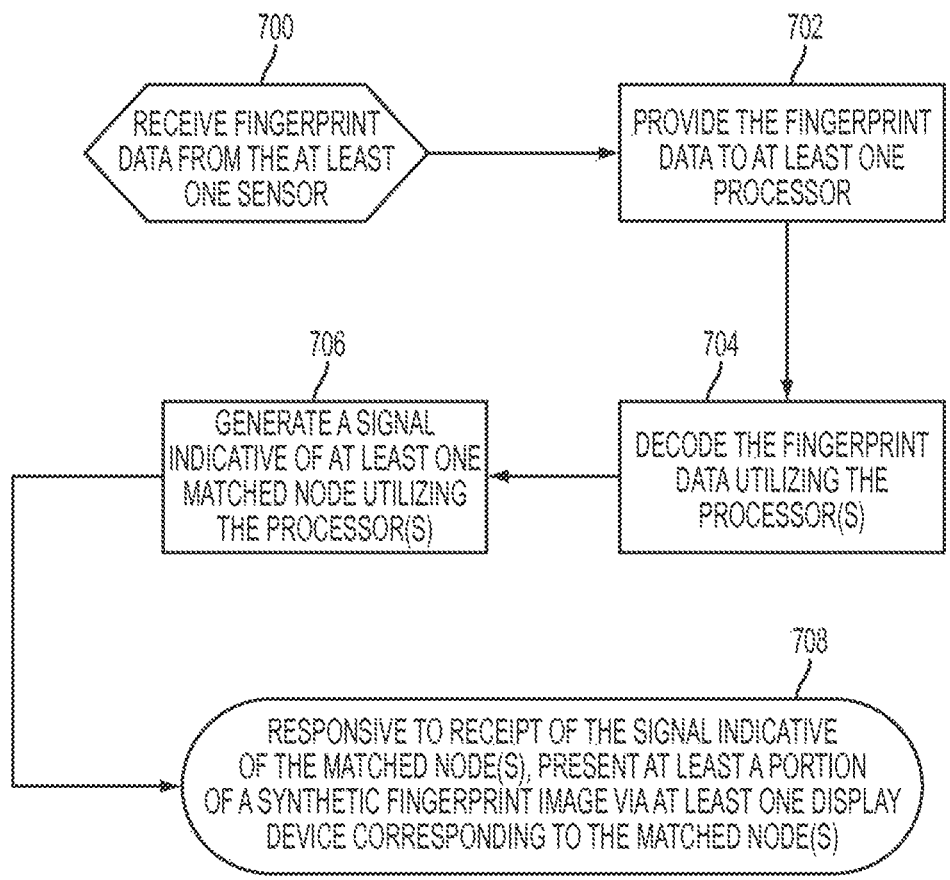
FIG. 7 is a flowchart illustrating an example method of fingerprint sensing, as described herein.

FIG. 7 illustrates an example method of fingerprint sensing, as described herein. The method begins with receiving fingerprint data from at least one sensor, step 700. Example approaches that may be used for receiving the fingerprint data are described in detail above. These example approaches may include utilizing at least one application processor.

The received fingerprint data is provided to at least one processor, step 702. The processor(s), as described in detail above, may include at least one secure enclave processor. The processor(s) decodes the fingerprint data, step 704, and provides a signal indicative of at least one matched node, step 706. Various example processes whereby the processor(s) performs these operations are described in detail above.

Responsive to receipt of the signal indicative of the matched node(s), at least a portion of a synthetic fingerprint image is presented via at least one display device, step 708. The portion of the synthetic fingerprint image presented corresponds to the matched node(s), as may be determined utilizing at least one application processor(s). Examples of the operation of application processors performing this step are described above.

Although embodiments have been described herein with respect to particular configurations and sequences of operations, it should be understood that alternative embodiments may add, omit, or change elements, operations and the like. Accordingly, the embodiments disclosed herein are meant to be examples and not limitations.

We claim:

1. A method comprising:
    detecting, at an electronic device, an attempt to perform an operation that requires biometric authentication;
    detecting biometric information of a biometric feature of a user; and
    in response to detecting the attempt to perform the operation, in accordance with a determination that the detected biometric information matches enrolled biometric information, highlighting a representation of the biometric feature, the representation of the biometric feature displayed on a display of the electronic device.

2. The method of claim 1, further comprising, in response to detecting the attempt to perform the operation, in accordance with the determination that the detected biometric information matches enrolled biometric information, performing the operation.

3. The method of claim 2, further comprising, in response to detecting the attempt to perform the operation, in accordance with a determination that the detected biometric information fails to match enrolled biometric information, forgoing performing the operation.

4. The method of claim 1, further comprising, in response to detecting the attempt to perform the operation, in accordance with a determination that the detected biometric information fails to match enrolled biometric information, providing feedback about the failure to match enrolled biometric information.

5. The method of claim 1, wherein the representation of the biometric feature is a synthetic representation of the biometric feature.

6. The method of claim 5, wherein the synthetic representation of the biometric feature uses one or more lines to represent the biometric feature.

7. The method of claim 1, wherein the representation of the biometric feature was displayed while enrolling the biometric feature.

8. The method of claim 1, wherein the biometric feature is a fingerprint.

9. The method of claim 1, wherein the detected biometric information is compared to biometric information of each of a plurality of enrolled biometric features.

10. An electronic device comprising:
   a biometric sensor; and
   a display configured to display a representation of a biometric feature of a user;
   wherein the electronic device is configured to:
      detect an attempt to perform an operation that requires biometric authentication;
      detect, with the biometric sensor, biometric information of the biometric feature of the user; and
      in response to detecting the attempt to perform the operation, in accordance with a determination that the detected biometric information matches enrolled biometric information, highlight the representation of the biometric feature.

11. The electronic device of claim 10, wherein the electronic device is further configured to, in response to detecting the attempt to perform the operation, in accordance with the determination that the detected biometric information matches enrolled biometric information, perform the operation.

12. The electronic device of claim 11, wherein the electronic device is further configured to, in response to detecting the attempt to perform the operation, in accordance with a determination that the detected biometric information fails to match enrolled biometric information, forgo performing the operation.

13. The electronic device of claim 10, wherein the electronic device is further configured to, in response to detecting the attempt to perform the operation, in accordance with a determination that the detected biometric information fails to match enrolled biometric information, provide feedback about the failure to match enrolled biometric information.

14. The electronic device of claim 10, wherein the representation of the biometric feature is a synthetic representation of the biometric feature.

15. The electronic device of claim 14, wherein the synthetic representation of the biometric feature uses one or more lines to represent the biometric feature.

16. The electronic device of claim 10, wherein the representation of the biometric feature was displayed while enrolling the biometric feature.

17. The electronic device of claim 10, wherein the biometric feature is a fingerprint.

18. The electronic device of claim 10, wherein the detected biometric information is compared to biometric information of each of a plurality of enrolled biometric features.

19. A non-transitory computer readable medium storing instructions that when executed by an electronic device cause the electronic device to:
   detect an attempt to perform an operation that requires biometric authentication;
   detect biometric information of a biometric feature of a user; and
   in response to detecting the attempt to perform the operation, in accordance with a determination that the detected biometric information matches enrolled biometric information, highlight a representation of the biometric feature, the representation of the biometric feature displayed on a display of the electronic device.

20. The non-transitory computer readable medium of claim 19, further storing instructions that when executed by the electronic device, cause the electronic device to:
   in response to detecting the attempt to perform the operation, in accordance with the determination that the detected biometric information matches enrolled biometric information, perform the operation; and
   in response to detecting the attempt to perform the operation, in accordance with a determination that the detected biometric information fails to match enrolled biometric information, forgo performing the operation.

* * * * *